United States Patent

Kagami

(10) Patent No.: US 9,109,962 B2
(45) Date of Patent: Aug. 18, 2015

(54) ELECTROMAGNETIC WAVE RADIATION DETECTION MEMBER, ELECTROMAGNETIC WAVE RADIATION DETECTION METHOD, AND DEVICE INCLUDING ELECTROMAGNETIC WAVE RADIATION DETECTION MEMBER

(75) Inventor: Takayuki Kagami, Saitama (JP)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 679 days.

(21) Appl. No.: 13/509,119

(22) PCT Filed: Nov. 15, 2010

(86) PCT No.: PCT/JP2010/006693
§ 371 (c)(1),
(2), (4) Date: May 10, 2012

(87) PCT Pub. No.: WO2011/064963
PCT Pub. Date: Jun. 3, 2011

(65) Prior Publication Data
US 2012/0222610 A1    Sep. 6, 2012

(30) Foreign Application Priority Data

Nov. 26, 2009    (JP) .................................. 2009-268980

(51) Int. Cl.
*G01N 5/00*    (2006.01)
*G01K 11/00*    (2006.01)
*G01K 3/04*    (2006.01)

(52) U.S. Cl.
CPC ................ *G01K 11/006* (2013.01); *G01K 3/04* (2013.01)

(58) Field of Classification Search
CPC ................................. G01K 11/006; G01K 3/04
USPC ........................ 250/474.1, 306; 324/204, 244
See application file for complete search history.

(56) References Cited

U.S. PATENT DOCUMENTS

2007/0110856 A1*    5/2007    Kanzaki ........................ 426/107

FOREIGN PATENT DOCUMENTS

| JP | 57-082628 | 5/1982 |
|---|---|---|
| JP | 63-218079 | 9/1988 |
| JP | 2000-276671 | 10/2000 |

(Continued)

OTHER PUBLICATIONS

International Search Report, PCT/JP2010/006693, Feb. 15, 2011.

(Continued)

*Primary Examiner* — David Porta
*Assistant Examiner* — Meenakshi Sahu

(57) ABSTRACT

To provide an electromagnetic wave radiation detection member, an electromagnetic wave radiation detection method, and a device including the electromagnetic wave radiation detection member that make it possible to determine whether an object to be detected has been heated by electromagnetic wave radiation by a microwave oven or the like. One embodiment includes a detection material 1 containing liquid and discoloring a substance to be attached to which the detection material adheres, and a bag 2 including the detection material 1 therein and from which the liquid flows out due to radiation of electromagnetic waves. Accordingly, the substance to be attached is discolored due to electromagnetic wave radiation, thereby making it possible to determine whether the electromagnetic waves have been radiated.

20 Claims, 12 Drawing Sheets

(56) References Cited

FOREIGN PATENT DOCUMENTS

| JP | 2002-111833 | 4/2002 |
|---|---|---|
| JP | 2003-172661 | 6/2003 |
| JP | 2005-165794 | 6/2005 |
| JP | 2005-178903 | 7/2005 |
| JP | 2005-214632 | 8/2005 |

OTHER PUBLICATIONS

Japanese Office Action dated Aug. 12, 2014 in corresponding Japanese Patent Application No. 2010-250583 with partial English language translation of Japanese Office Action.

* cited by examiner

UPPER DIAGRAM     SIDE DIAGRAM     INK FLOW DIAGRAM SEEN FROM ABOVE

UPPER DIAGRAM    SIDE DIAGRAM    INK FLOW DIAGRAM
                                 SEEN FROM ABOVE

MOBILE TERMINAL DEVICE SEEN
FROM SIDE OF BATTERY COVER

MOBILE TERMINAL DEVICE
WHOSE BATTERY COVER IS MOVED

DIAGRAM SEEN FROM REAR SIDE (DEVICE INNER SIDE)
AFTER REMOVING BATTERY COVER

ELECTROMAGNETIC WAVE RADIATION DETECTION MEMBER, ELECTROMAGNETIC WAVE RADIATION DETECTION METHOD, AND DEVICE INCLUDING ELECTROMAGNETIC WAVE RADIATION DETECTION MEMBER

TECHNICAL FIELD

The present invention relates to an electromagnetic wave radiation detection member, an electromagnetic wave radiation detection method, and a device including the electromagnetic wave radiation detection member that detect and record radiation of electromagnetic waves.

BACKGROUND ART

In recent years, the number of failures in mobile terminal devices destroyed as a result of being heated by electromagnetic wave radiation equipment such as microwave ovens has been increasing. One reason behind this is that microwave ovens are sometimes used as means for drying wet mobile terminal devices. Based on this situation, mobile terminal devices that record temperature history have been proposed (see, for example, patent literatures 1 and 2).

A mobile terminal device disclosed in a patent literature 1 includes a label, and operates as follows. The label is colored when temperature reaches a predetermined temperature. The coloring is performed by wax or a chemical reaction. Accordingly, it is possible to determine that the temperature has reached a predetermined temperature.

A mobile terminal device disclosed in a patent literature 2 includes a label, and operates as follows. A temperature indicating element of the label is melted and flowed, and black carbon which is in the background is seen in black when the temperature reaches a predetermined temperature. Accordingly, it is possible to determine that the temperature has reached a predetermined temperature.

Meanwhile, other techniques for measuring the temperature of an object to be heated in a microwave oven have been suggested (see, for example, patent literatures 3 to 5).

A packaging container disclosed in the patent literature 3 includes a seal, and operates as follows. The seal peels off when steam pressure in the packaging container increases. In this way, it is notified that heat-cooking of the object to be heated in the packaging container has been completed.

A temperature detector disclosed in the patent literature 4 includes a thermal sensing probe, and operates as follows. The thermal sensing probe detects the temperature of the object to be heated while using microwaves as a power supply. Accordingly, the temperature of the object to be heated placed on a turntable is detected.

A packaging container disclosed in the patent literature 5 includes a seal, and operates as follows. A cutline is provided in the seal, and the cutline is broken when the steam pressure in the packaging container increases. In this way, it is notified that heat-cooking of the object to be heated in the packaging container has been completed.

CITATION LIST

Patent Literature

PTL 1: Japanese Unexamined Application Publication No. 2002-111833
PTL 2: Japanese Unexamined Application Publication No. 2005-165794
PTL 3: Japanese Unexamined Application Publication No. 2005-178903
PTL 4: Japanese Unexamined Application Publication No. 57-082628
PTL 5: Japanese Unexamined Application Publication No. 63-218079

SUMMARY OF INVENTION

Technical Problem

However, since the mobile terminal devices disclosed in the patent literatures 1 and 2 determine that the temperature has reached a predetermined temperature, it is impossible to determine whether an object to be detected has been heated by a microwave oven.

Further, in the temperature detector disclosed in the patent literature 4, the temperature of the object to be heated is lowered when the temperature detector disclosed in the patent literature 4 is taken outside the microwave oven. Thus, it is impossible to detect that the object to be heated was destroyed by the heat of the microwave oven. The packaging containers disclosed in the patent literatures 3 and 5 notify that heat-cooking of the object to be heated has been completed by peeling the seal or breaking the cutline, which means it is impossible to determine whether the object to be detected has been heated by a microwave oven. Such an aforementioned problem may occur not only in microwave ovens but also when heating by electromagnetic wave radiation is performed.

The present invention aims to provide an electromagnetic wave radiation detection member, an electromagnetic wave radiation detection method, and a device including the electromagnetic wave radiation detection member which make it possible to determine whether an object to be detected has been heated by electromagnetic wave radiation by a microwave oven or the like.

Solution to Problem

An electromagnetic wave radiation detection member according to the present invention includes: a detection material containing liquid and discoloring a substance to be attached to which the detection material adheres; and a bag including the detection material therein and from which the liquid flows out due to radiation of electromagnetic waves.

An electromagnetic wave radiation detection member including: a detection material containing liquid and discoloring a substance to be attached to which the detection material adheres; and a bag including the detection material therein and from which the liquid flows out due to radiation of electromagnetic waves is attached to a device including the electromagnetic wave radiation detection member according to the present invention.

An electromagnetic wave radiation detection method according to the present invention includes: flowing out a detection material including liquid from a bag due to electromagnetic wave radiation; and attaching the detection material flowed from the bag to a substance to be attached to discolor the substance to be attached.

Advantageous Effects of Invention

According to the present invention, it is possible to provide an electromagnetic wave radiation detection member, an electromagnetic wave radiation detection method, and a device including the electromagnetic wave radiation detection member which make it possible to determine whether an object to be detected has been heated by electromagnetic wave radiation by a microwave oven or the like.

DESCRIPTION OF EMBODIMENTS

With reference to the accompanying drawings, exemplary embodiments of the present invention will be described. The exemplary embodiments described below are examples of the present invention, and the present invention is not limited to the following exemplary embodiments. Throughout the specification and the drawings, the same components are denoted by the same reference symbols.

Figure 1:
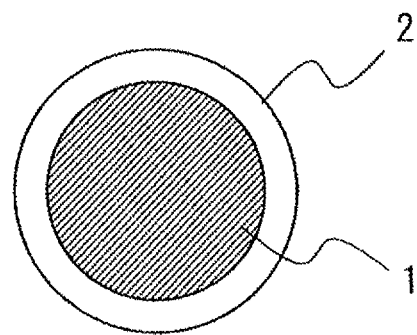
FIG. 1 is a diagram schematically showing an electromagnetic wave radiation detection member according to exemplary embodiments of the present invention.

With reference to FIG. 1, an electromagnetic wave radiation detection member according to exemplary embodiments will be described. The electromagnetic wave radiation detection member includes a detection material 1 containing liquid, and a bag 2 containing the detection material 1 therein. The detection material 1 flows out from the bag 2 due to radiation of electromagnetic waves. In short, the bag 2 is broken, and the detection material 1 flows outside the bag 2. Then the detection material 1 flowed out of the bag 2 adheres to a substance to be attached (not shown) such as a test paper or the like, and the substance to be attached is discolored. In this way, it is possible to determine whether an object to be detected to which the electromagnetic wave radiation detection member is attached has been heated by electromagnetic wave radiation. Such an electromagnetic wave radiation detection member is used while being attached to mobile terminal devices including mobile telephones, or a member, a toy or the like that is thermally deformed by heat.

First Exemplary Embodiment

Figure 2:
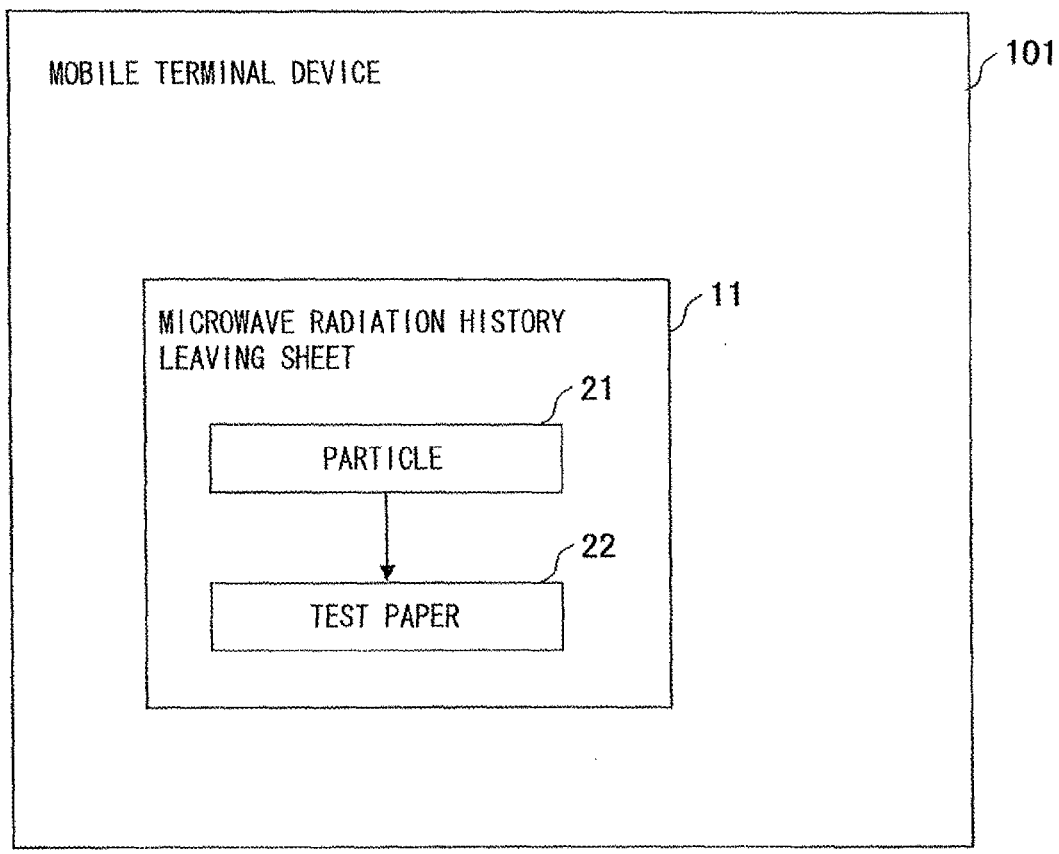
FIG. 2 is a diagram showing an example of a mobile terminal device according to a first exemplary embodiment.

A mobile terminal device including an electromagnetic wave radiation detection member according to a first exemplary embodiment will be described. FIG. 2 shows one example of the mobile terminal device according to the first exemplary embodiment. A mobile terminal device 101 according to the first exemplary embodiment includes a microwave radiation history leaving sheet 11 attached thereto that detects microwaves released in a microwave oven as one example of electromagnetic waves. The microwave radiation history leaving sheet 11 is used to detect microwaves, i.e., electromagnetic wave radiation. The microwave radiation history leaving sheet 11 is able to determine whether the mobile terminal device has been heated by a microwave oven. Accordingly, it is possible to determine whether the mobile terminal device 101 has been heated by the microwave oven.

The microwave radiation history leaving sheet 11 is arranged in an insertion unit of an external memory, in an earphone connection unit, or in a vicinity of an antenna part of the mobile terminal device 101, for example. These are examples of places inside or outside the device in which it is possible to easily recognize and detect that the device has been irradiated with electromagnetic waves, and in which electromagnetic waves from outside are hardly shielded by a metal part in the device. Since the microwave radiation history leaving sheet 11 is formed in a sheet-like shape, it can be attached to a space of the mobile terminal device 101. Accordingly, it is possible to provide a seal which may be attached to any desired place without concerning about the thickness and the size.

The microwave radiation history leaving sheet 11 includes a particle 21 and a test paper 22. The particle 21 is the electromagnetic wave radiation detection member shown in FIG. 1, and includes ink which is the detection material 1 and a film which is the bag 2. The particle 21 contains the ink with a film, and the ink flows out from the film upon radiation of microwaves. The test paper 22 discolors when the ink adheres to the test paper 22. The test paper 22 is discolored upon radiation of microwaves, which makes it possible to determine whether the mobile terminal device 101 has been heated by a microwave oven. Accordingly, it is possible to determine whether the mobile terminal device 101 is heated by the microwave oven.

Figure 3:
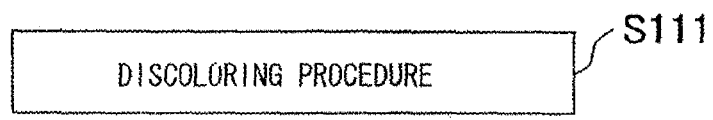
FIG. 3 is a diagram showing an example of a microwave radiation history leaving method according to the first exemplary embodiment.

The microwave radiation history leaving sheet 11 according to the first exemplary embodiment enables a microwave radiation history leaving method according to the first exemplary embodiment. FIG. 3 shows one example of the microwave radiation history leaving method according to the first exemplary embodiment. The microwave radiation history leaving method according to the first exemplary embodiment includes a discoloring procedure S111. In the discoloring procedure S111, upon radiation of microwaves, the ink wrapped in the film of the particle 21 flows out of the film to discolor the test paper 22. The test paper 22 is discolored due to radiation of microwaves, thereby capable of determining whether the mobile terminal device 101 has been heated by the microwave oven. Accordingly, it is possible to determine whether the mobile terminal device 101 has been heated by the microwave oven.

For example, the ink is thermally expanded due to radiation of microwaves. In this case, the film bursts by the volume of the ink whose temperature has reached a predetermined temperature. Accordingly, it is possible to let the ink flow from the film upon radiation of microwaves.

In this case, the microwave radiation history leaving method according to the first exemplary embodiment executes the following procedure. When microwaves are radiated in the discoloring procedure S111 shown in FIG. 3, the ink is vaporized and expanded, and the film bursts due to the volume of the ink whose temperature has reached a predetermined temperature.

For example, the temperature of the film increases upon radiation of microwaves, and the film dissolves when the temperature reaches a predetermined temperature. In this way, it is possible to let the ink flow from the film upon radiation of microwaves.

A thermoplastic (thermosoftening) resin may be used as a film, for example. More specifically, a nylon resin which is a thermoplastic resin is preferably used. The nylon resin softens with an increase in temperature, which makes it possible to let the ink flow when the temperature and the volume of the ink increase.

In this case, the following procedure is executed as the microwave radiation history leaving method according to the first exemplary embodiment. When microwaves are radiated in a discoloring procedure S111 shown in FIG. 3, the temperature of the film increases. When the temperature reaches a predetermined temperature, the film dissolves.

The color of the ink may be any desired one as long as a person can recognize that the ink has adhered to the test paper and the ink has flowed. Thus, the color of the ink is preferably different from that of the color test paper. In this case, the test paper 22 is discolored to the color of the ink when the ink adheres to the test paper 22. Since the test paper 22 may be colored to the color of the ink depending on the material of the ink or the material of the test paper, discoloring in this specification includes coloring as well.

In this case, the microwave radiation history leaving method according to the first exemplary embodiment executes the following procedure. In the discoloring procedure S111 shown in FIG. 3, the ink having color other than white is flowed outside the film to discolor the test paper 22 to the color of the ink.

Further, burst of the film due to vaporization and expansion and dissolution of the film due to an increase in temperature may be performed separately from each other, or both systems may be combined.

The ink may be transparent liquid: in this case, the ink is discolored due to a chemical reaction. Alternatively, the chemical reaction may occur in the test paper 22: in this case, the test paper 22 is discolored due to the chemical reaction when the ink adheres to the test paper 22. In contrast, the transparent liquid may be reacted with chemicals adhered to the test paper and discolored.

Further, the discoloring of the test paper may not be performed by a chemical reaction. Dye or pigment arranged in the test paper 22 is configured to be hidden by a surface layer. Such a structure may be employed in which solvent such as water flows, which dissolves the dye or the pigment arranged in the test paper to discolor the surface layer. Alternatively, a test paper including an existing water leakage detection mark may be used. When the test paper including the water leakage detection mark is wet, the dye or the pigment formed in patterns dissolves and the patterns are disrupted, whereby detection can be performed.

Further, it is not necessary that the ink is transparent in every case. The ink may be liquid into which pigment is mixed, not only dye, or may be the one that causes a chemical reaction so that changes of colors before and after discoloring after the ink adheres to the test paper are clearly recognized. More specifically, acid colored liquid may be used with a blue litmus paper: in this case, acid in which copper or iron dissolves is spilt to change the color of the blue litmus paper to red. Alternatively, the dye or the pigment arranged in the test paper may be mixed with the ink, which produces a different color which is neither the color of the ink nor the color of the dye or the pigment. For example, such a structure may be employed in which yellow water and green pigment may be mixed to produce yellow-green color.

In summary, it is only required that a situation in which the liquid inside the particle flows and adhered to the test paper can be recognized as the changes of colors visible from outside.

In this case, the microwave radiation history leaving method according to the first exemplary embodiment executes the following procedure. In the discoloring procedure S111 shown in FIG. 3, the transparent ink flows outside the film, and the chemical reaction between the ink and the test paper occurs to discolor the test paper 22.

The test paper 22 may a plate-like shape. In this case, the particle 21 is preferably arranged between two test papers. Since the microwave radiation history leaving sheet 11 is a flat plate, it may be attached to a space of the mobile terminal device 101.

Second Exemplary Embodiment

Figure 4:
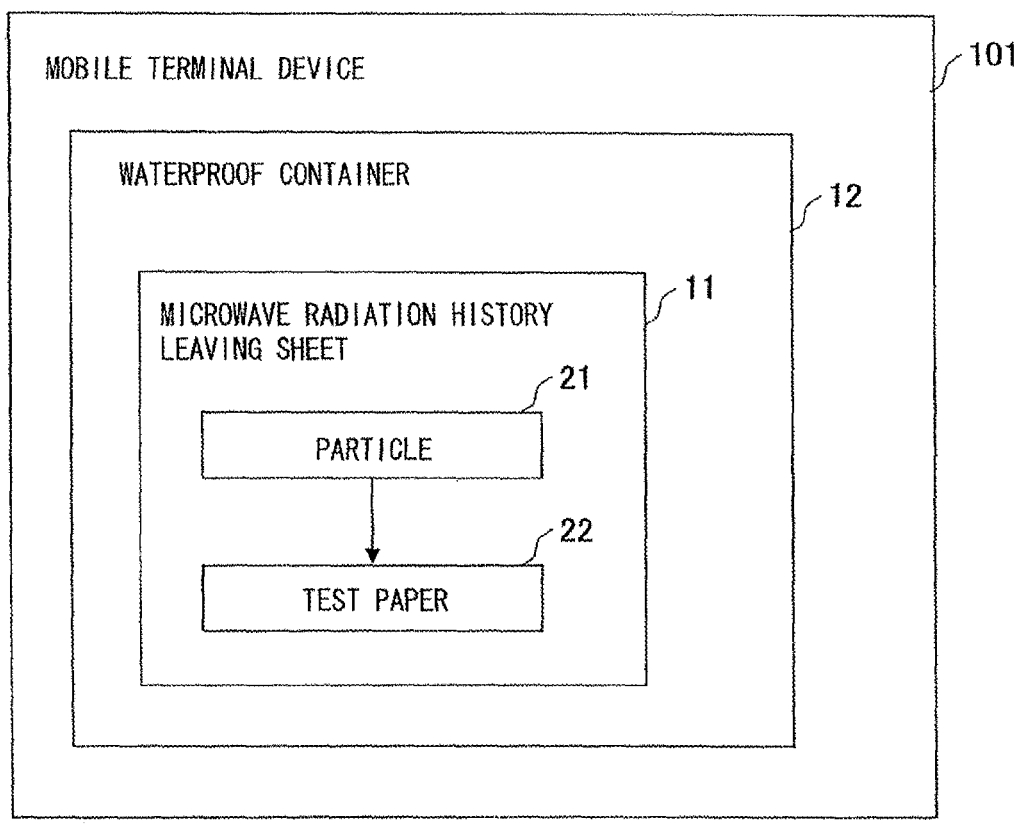
FIG. 4 is a diagram showing one example of a mobile terminal device according to a second exemplary embodiment.

FIG. 4 shows one example of a mobile terminal device according to a second exemplary embodiment. A mobile terminal device 101 according to the second exemplary embodiment further includes a waterproof container 12 in addition to the components in the mobile terminal device 101 according to the first exemplary embodiment. The waterproof container 12 seals a particle 21 and a test paper 22. Accordingly, it is possible to prevent discolor of the test paper 22 due to other factors than the ink. Further, it is possible to prevent volatilization of the ink. Further, it is possible to prevent the ink from flowing outside a microwave radiation history sheet 11, thereby preventing causes of further failure of elements inside the device and preventing the ink from being adhered to peripheral parts outside the device to contaminate these parts.

The waterproof container 12 is a substantially transparent member that allows a person to check discolor of the test paper due to ink flow from outside. It is preferable to use a material that hardly gives an influence on the ink, the particle 21, and the test paper 22 in the sealing process. A laminating resin which is a synthetic resin as one example of such material may be used as the waterproof container 12. Further, the waterproof container 12 is preferably a transparent resin. In this way, the discolor of the test paper 22 may be clearly seen. Further, the waterproof container 12 may be a substantially transparent silicone resin.

At least a part of an outer wall of the waterproof container 12 has adhesiveness. Accordingly, the microwave radiation history leaving sheet 11 may be attached to the mobile terminal device 101.

Third Exemplary Embodiment

Figure 5:
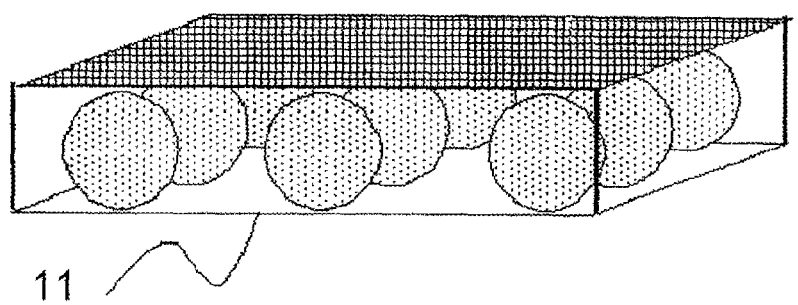
FIG. 5 is a diagram showing one example of a microwave radiation history leaving sheet according to a third exemplary embodiment.

FIG. 5 shows one example of a microwave radiation history leaving sheet according to a third exemplary embodiment. A microwave radiation history leaving sheet 11 confines ink in particles. Upon radiation of microwaves from a microwave oven, particles of the ink are heated and broken, which allows the ink to flow inside the microwave radiation history leaving sheet 11. In this way, the microwave radiation history leaving sheet 11 itself is discolored, which notifies that microwaves are radiated.

Figure 6:
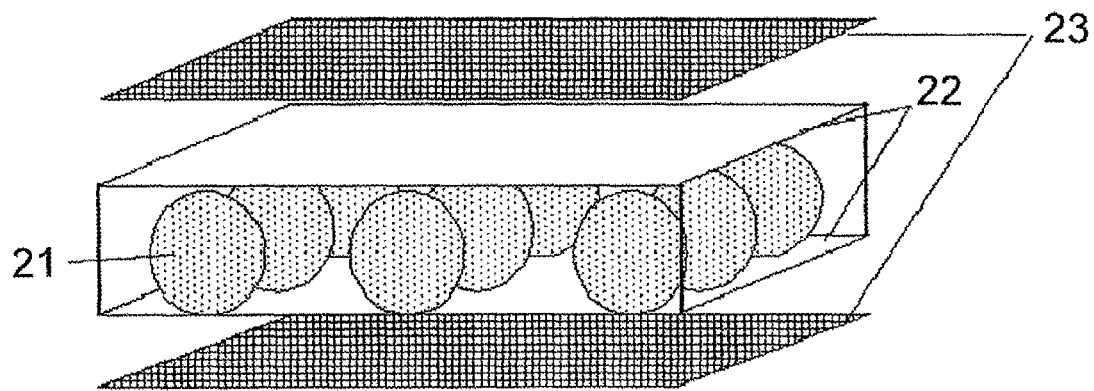
FIG. 6 is a diagram showing a structural example of the microwave radiation history leaving sheet according to the third exemplary embodiment.

FIG. 6 shows a structural example of the microwave radiation history leaving sheet according to the third exemplary embodiment. The microwave radiation history leaving sheet 11 according to the third exemplary embodiment includes particles 21, test papers 22, and plate-like materials 23.

A plurality of particles 21, each of which confining ink, are arranged in a lattice shape. The test papers 22 which are discolored upon absorbing the ink hold and package the particles 21.

The test papers 22 are further packaged by the plate-like materials 23 so as not to flow the ink absorbed in the test papers 22 outside the microwave radiation history leaving sheet 11. The plate-like materials 23 serve as the waterproof container 12 described in the second exemplary embodiment. Since the particles 21 and the test papers 22 are packaged, the test papers 22 are not discolored by fluid from outside, but are discolored only by the ink from inside. Accordingly, it is possible to prevent discolor of the test papers 22 in other cases than the case in which microwaves are radiated.

Next, each material will be described.

The ink used for the particle 21 is a typical one in which dye is dissolved in solvent, and is liquid having relatively low viscosity, and has such a color that makes it easy to recognize the discolor.

As the film of the particle 21 packaging the ink, a thin film material that dissolves or broken by expansion when it is heated is used. The film of the particle 21 is not broken by pressure by hands or other stuffs in a normal state. As one example, an extremely thin material such as nylon may be used as well.

Inkjet papers are used as the test papers 22 due to its high absorbent and drying property of the ink, and such papers are used to allow a person to recognize that the paper has absorbed the ink from both surfaces.

The plate-like material 23 uses a laminate as a transparent material so as to prevent ink leakage from inside the microwave radiation history leaving sheet 11, to prevent fluid from outside from entering therein, and to allow a person to recognize that the test paper 22 has absorbed the ink.

Figure 7:
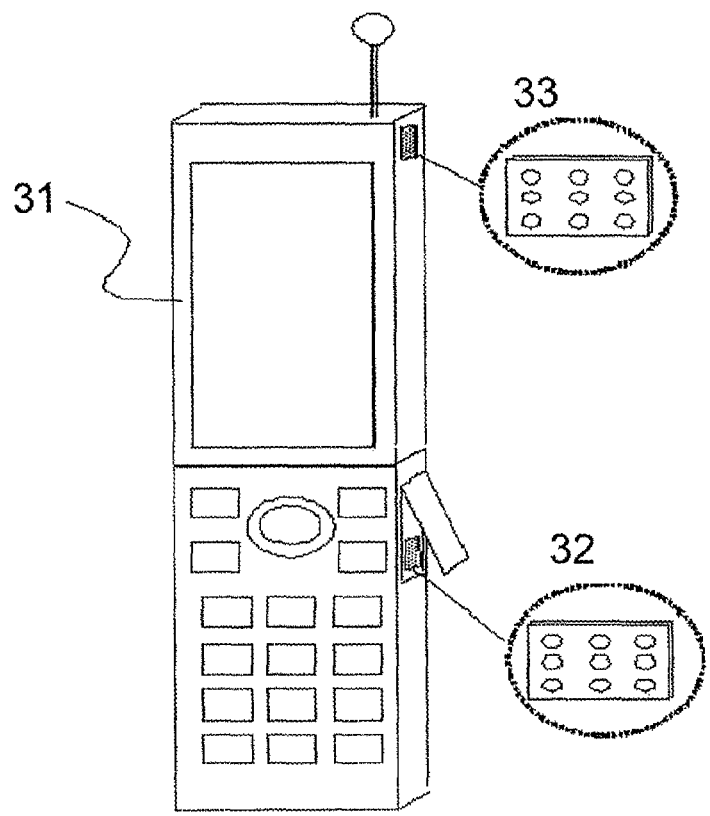
FIG. 7 is a diagram showing one example of a mobile terminal device according to the third exemplary embodiment.

FIG. 7 shows one example of the mobile terminal device according to the third exemplary embodiment. The microwave radiation history leaving sheet 11 is attached to any desired position in which detection results of destruction by microwave ovens can be checked without taking apart a mobile terminal device 31.

When the destruction by the microwave oven occurs, fluid enters the mobile terminal device 31 and is heated to destroy electronic components of the mobile terminal device 31. Thus, the microwave radiation history leaving sheet 11 is attached to a position inside or outside the mobile terminal device in which it is possible to easily recognize and detect that the device has been irradiated with electromagnetic waves, and in which electromagnetic waves from outside are hardly shielded by a metal part in the device. Specifically, the microwave radiation history leaving sheet 11 is attached, for example, to an insertion unit of an external memory, a vicinity of earphone connection unit 32, or a vicinity of an antenna part 33 where the fluid can be easily entered.

Described next is an operation of the seal when heated by the microwave oven.

First, the summary will be described of the process until when the mobile terminal device 31 is destructed when it is heated by the microwave oven. When heating is started by the microwave oven, microwaves of a specific frequency are released from the microwave oven, and the number of times of vibration of microwaves becomes equal to a natural frequency of water molecules, which violently vibrates water molecules included in the mobile terminal device 31. When the vibration of the water molecules in the mobile terminal device 31 becomes violent, frictional heat is generated and the temperature becomes high, which causes destruction.

Figure 8:
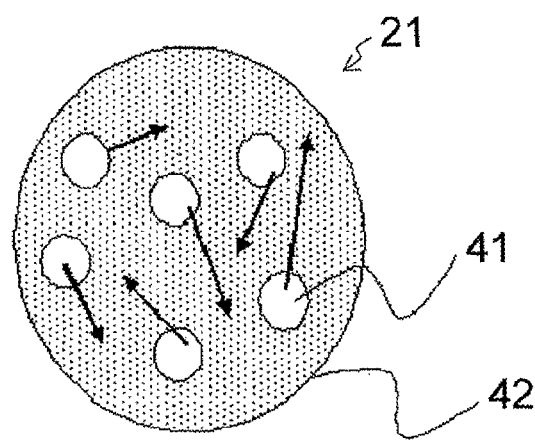
FIG. 8 is an enlarged diagram of a particle.
Figure 9:
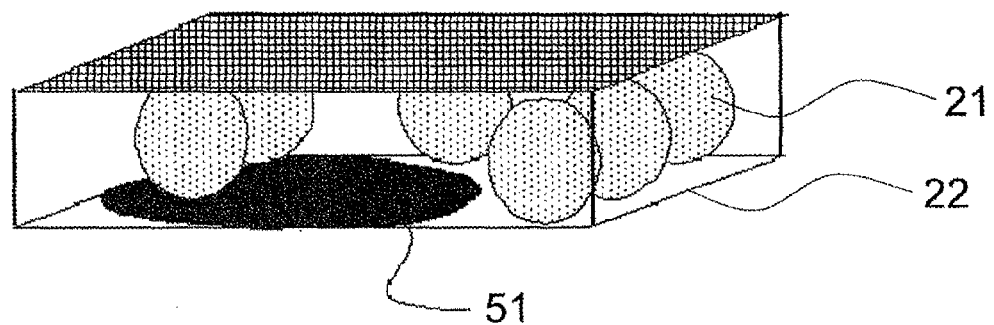
FIG. 9 is a diagram showing a state of a microwave radiation history leaving sheet after microwave radiation.
Figure 10:
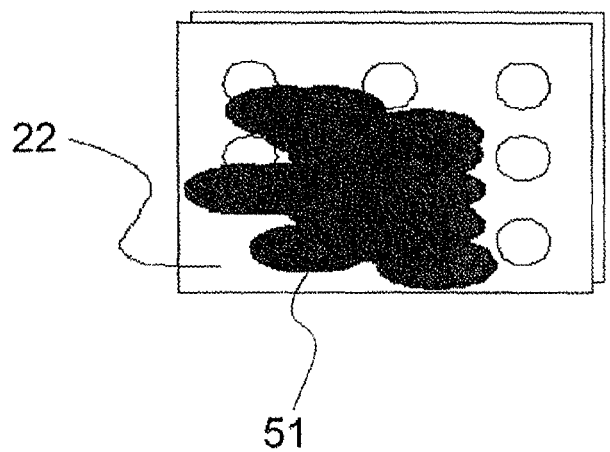
FIG. 10 is a diagram showing a state of a test paper after microwave radiation.

One example of the operation of the microwave radiation history leaving sheet 11 in the destruction operation will be described with reference to FIGS. 6, 8, 9, and 10. FIG. 8 is an enlarged diagram of the particle. FIG. 9 shows a state of the microwave radiation history leaving sheet after microwave radiation. FIG. 10 shows a state of the test paper after the microwave radiation.

As shown in FIG. 8, when an ink 41 is irradiated with microwaves released at the time of operation of the microwave oven, water molecules included in the ink 41 are violently vibrated, and the temperature of the ink 41 increases. As a result, the particle 21 expands, a film 42 confining the ink 41 is broken, and the ink 41 flows out of the film 42.

As shown in FIGS. 9 and 10, the test paper 22 absorbs the ink 41 that flows out, and a part 51 in which the test paper 22 is discolored appears. In this way, the changes in the test paper 22 are visually notified.

The test paper 22 that is discolored is not exposed to the air because of the plate-like material 23 arranged to prevent external leakage of the ink. Thus, the ink is not volatilized or oxidized. Further, the test paper 22 is not discolored due to other factors than the ink, which makes it possible to keep the discolored state.

While the paper is discolored using the dye as the material of the ink in the third exemplary embodiment, any kind of liquid and any kind of paper may be used as long as the paper can be discolored with colored liquid material. Furthermore, instead of a paper, a material like a cloth which is an aggregation of fibers or a sponge may be used, for example, as long as it can be recognized that the ink has flowed.

Further, the ink liquid is confined in particles to form the microwave radiation history leaving sheet 11 in the third exemplary embodiment. The liquid in the particle may be colorless and transparent water. In this case, discoloring is notified using a material that discolors the paper absorbing the water flowing out when the particle bursts in reaction with water.

The color of the ink may be any desired one as long as it is recognized that the ink has flowed after it adhered to the test paper. In this case, the test paper 22 is discolored to the color of the ink when the ink adheres to the test paper 22.

In this case, the microwave radiation history leaving method according to the first exemplary embodiment executes the following procedure. In the discoloring procedure S111 shown in FIG. 3, the ink having a color other than white is flowed outside the film and the test paper 22 is discolored to the color of the ink.

As described in the first exemplary embodiment, the ink may be transparent liquid: in this case, the ink is discolored due to a chemical reaction. Alternatively, the chemical reaction may occur in the test paper 22: in this case, the test paper 22 is discolored due to the chemical reaction when the ink adheres to the test paper 22. In contrast, the transparent liquid may be reacted with chemicals adhered to the test paper and discolored.

Further, it is not necessary that the chemical reaction is performed. Dye or pigment arranged in the test paper 22 is configured to be hidden by a surface layer. Such a structure may be employed in which solvent such as water included in the bag flows, which dissolves the dye or the pigment arranged in the test paper to discolor the surface layer. Alternatively, a test paper including an existing water leakage detection mark may be used. When the test paper including the water leakage detection mark is wet, the dye or the pigment formed in patterns dissolves and the patterns are disrupted, whereby detection can be performed.

Further, it is not necessary that the ink is transparent in every case. The ink may be liquid into which pigment is mixed, not only dye, or may be the one that causes a chemical reaction so that changes of colors before and after discoloring after the ink adheres to the test paper are clearly recognized. More specifically, acid colored liquid may be used with a blue litmus paper: in this case, acid in which copper or iron dissolves is spilt to change the color of the blue litmus paper to red. Alternatively, the dye or the pigment arranged in the test paper may be mixed with the ink, which produces a different color which is neither the color of the ink nor the color of the dye or the pigment. For example, such a structure may be employed in which yellow water and green pigment may be mixed to produce yellow-green color.

In summary, it is only required that a situation in which the liquid inside the particle flows and adhered to the test paper can be recognized by the changes of colors visible from outside.

While the object to which the microwave radiation history leaving sheet 11 is attached is the mobile terminal device, the microwave radiation history leaving sheet 11 may be attached to any equipment including electronic equipment and electrical equipment destroyed due to radiation of microwaves, or equipment other than the electronic equipment and the electrical equipment which causes malfunction.

Further, while the microwave radiation history leaving sheet 11 has been described to have a seal-like shape, the adhesive material may not be attached to the microwave radiation history leaving sheet 11. For example, the microwave radiation history leaving sheet 11 may be formed in a chip-like shape, and may be stored and fit in a case or a tool of a socket-like shape provided on a side of the body.

Fourth Exemplary Embodiment

Described in the first to third exemplary embodiments are structures using test papers. In short, when a particle containing an ink in a film is irradiated with microwaves, the ink is flowed from the film. The structure has been described in which the test paper is discolored when the ink adheres to the test paper, and the test paper is discolored upon radiation of microwaves. However, it is sufficient that a person can recognize that the ink has flowed. The test paper is not necessarily used. Described next is an exemplary embodiment in which the test paper is not necessary.

Figure 11:
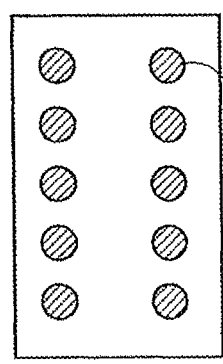
FIG. 11 is a diagram schematically showing one example of a structure of an electromagnetic wave radiation detection member according to a fourth exemplary embodiment.
Figure 11:
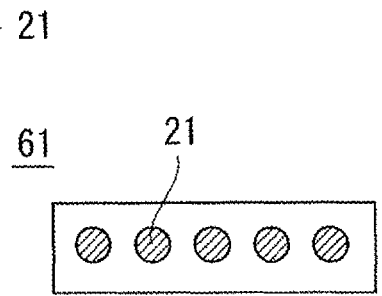
Figure 11:
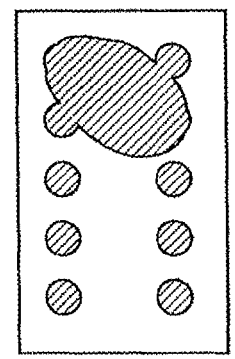
Figure 12:
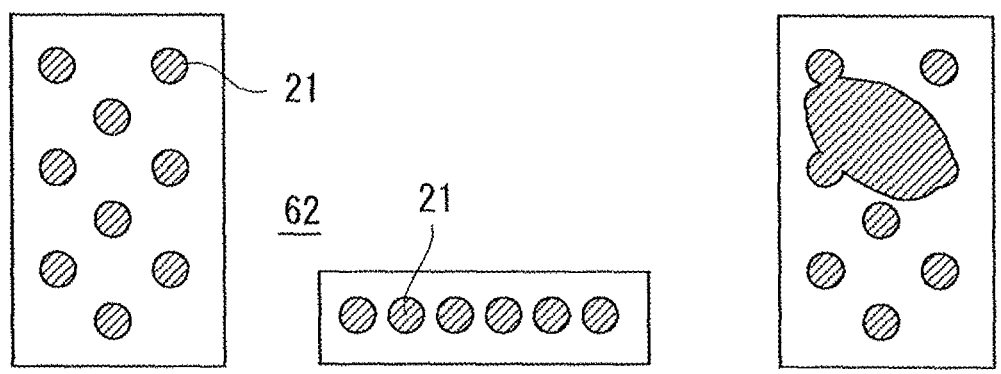
FIG. 12 is a diagram schematically showing another example of the structure of the electromagnetic wave radiation detection member according to the fourth exemplary embodiment.

With reference to FIGS. 11 and 12, an electromagnetic wave radiation detection member that detects and records radiation of electromagnetic waves according to a fourth exemplary embodiment of the present invention will be described. FIGS. 11 and 12 show a top diagram, a side diagram, and an ink flow diagram of the electromagnetic wave radiation detection member. Note that description of the same structures as those in the above exemplary embodiments is omitted as appropriate.

Referring to the electromagnetic wave radiation detection member in FIGS. 11 and 12, examples of an element 61 in which particles 21 are arranged in a lattice shape (FIG. 11) and an element 62 in which particles 21 are alternately arranged (FIG. 12) are included. In both cases, the particles 21 are arranged at regular intervals. By employing such a structure, a part colored when the ink is flowed can be discerned from the particles 21 arranged at equal intervals, which makes it possible to check the detection without the test paper 22.

Figure 13:
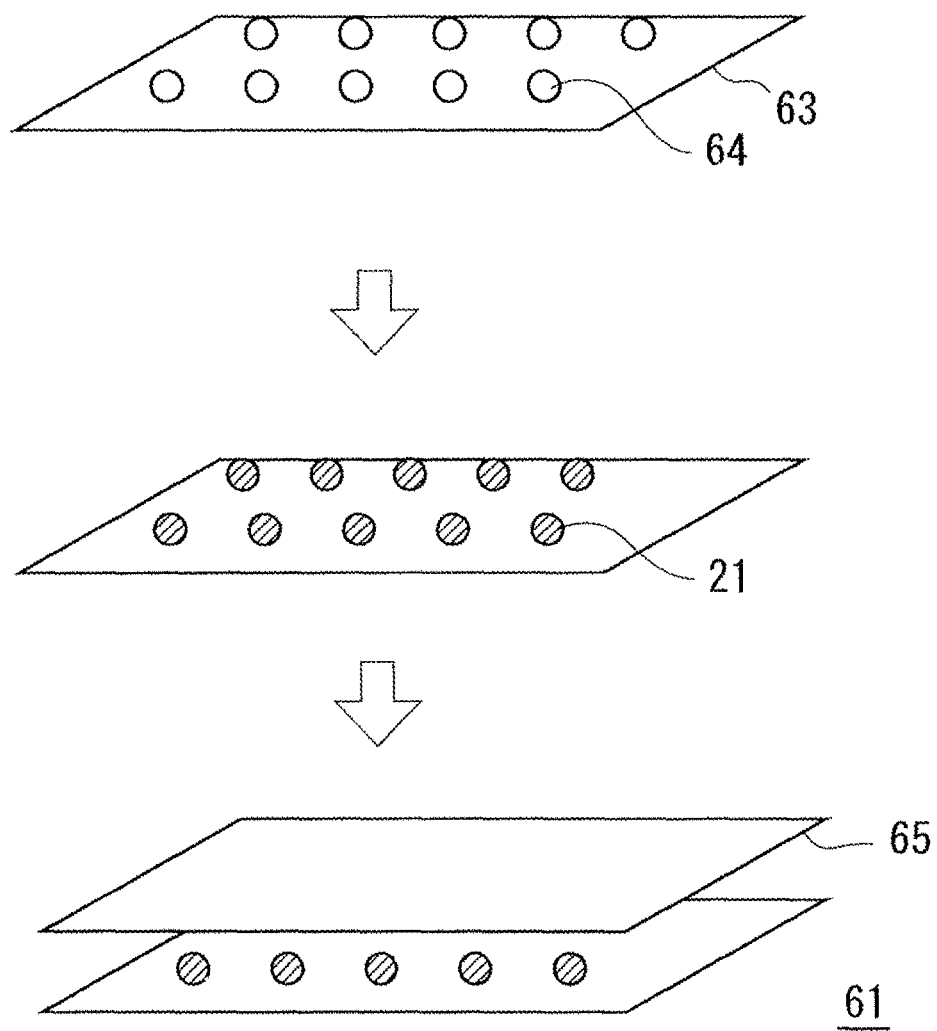
FIG. 13 is a diagram showing a structure of the electromagnetic wave radiation detection member according to the fourth exemplary embodiment in detail.

Specific examples will be described with reference to FIG. 13. FIG. 13 is a diagram for describing a manufacturing process, and is an oblique diagram of the electromagnetic wave radiation detection member 61.

The electromagnetic wave radiation detection member 61 shown in FIG. 13 includes a base 63, adhesive materials 64, particles 21 including ink, and a protective sheet 65. First, the adhesive materials 64 for arranging particles on the base 63 at predetermined equal intervals are arranged by a method like printing, for example. Then, by rolling the particles 21 on the base 63, the particles 21 are fixed by the adhesive materials 64. It already works as an electromagnetic wave radiation detection member. However, in order to prevent the particles 21 from being peeled, the protective sheet 65 is covered from above. In this way, it is possible to arrange the particles 21 at predetermined intervals.

The protective sheet 65 is preferably made of a substantially transparent member so as to allow a person to check that the ink has flowed. Further, the color of the protective sheet 65 is preferably different from that of the base to allow a person to recognize the ink has flowed.

The base 63 may be a seal-like member having a rear surface to which the adhesive materials 64 are applied. Further, the base 63 may be an in-device member like a printed board, and may have a structure in which the particles are directly adhesively fixed thereto. Note that concave portions according to the particle shape may be arranged in the base 63 instead of the adhesive materials 64. In this case, by rolling the particles 21 on the base 63, the particles 21 are placed and fixed to the concave portions.

Further, the protective sheet 65 may form a part of the waterproof container 12 shown in the above exemplary embodiments. Further, the waterproof container 12 may be used instead of covering with the protective sheet 65. In this case, the electromagnetic wave radiation detection member 61 may be formed to be wrapped by a transparent laminating resin which is a synthetic resin as the waterproof container 12. Further, the protective sheet 65 may be a transparent silicone resin.

Further, while shown in FIGS. 11 and 12 are examples in which the particles 21 are arranged in two lines and three lines at equal intervals, respectively, other structures may be employed as long as the ink flow can be recognized by disturbance of patterns of particles. For example, the particles 21 may be arranged in one line at equal intervals, or may be the repeat of specific continuous patterns instead of the equal intervals.

Fifth Exemplary Embodiment

In the fourth exemplary embodiment, the shape of the flow when the ink flows is left to its nature; in this case, a person may take time to make a judgment. Now, a fifth exemplary embodiment will be described in which the structure of the fourth exemplary embodiment is further improved.

Figure 14:
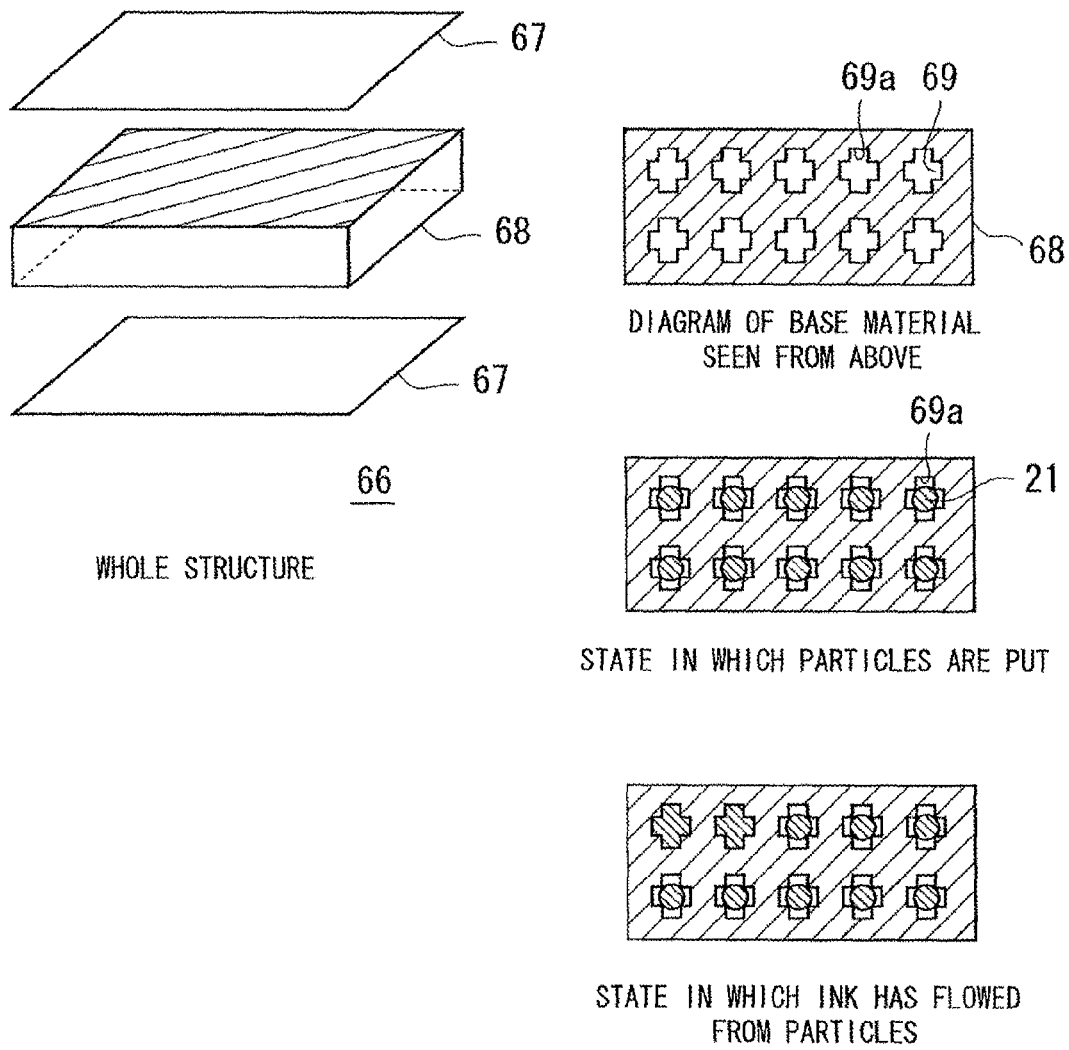
FIG. 14 is a diagram showing a structure of an electromagnetic wave radiation detection member according to a fifth exemplary embodiment in detail.

With reference to FIG. 14, an electromagnetic wave radiation detection member that detects and records radiation of electromagnetic waves according to the fifth exemplary embodiment of the present invention will be described. FIG. 14 is a diagram showing a structure of the electromagnetic wave radiation detection member according to the fifth exemplary embodiment in detail. Note that description of the same components as those in the above exemplary embodiments will be omitted as appropriate.

Referring to the whole structure diagram of FIG. 14, an electromagnetic wave radiation detection member 66 includes an upper cover 67, a base material 68, a lower cover 67, and particles 21 including ink. The cover 67 is a substantially transparent member, e.g., a PET film, which allows a person to see the ink flow inside. The covers 67 are bonded to the base material 68 by adhesive material, bonding agent or the like to closely adhere to and seal the base material 68. The base material 68 which is a substance to be attached is made of resin or rubber. Cross-shaped holes 69 to arrange the particles 21 at predetermined intervals are opened inside the base material 68 (see top diagram of the base material). The particles 21 are stored in the holes 69. While the depth of the holes 69 varies depending on the material of the base material 68, it is set to be deeper than the diameter of the particles 21 in this example. In this way, the particles 21 can be definitely contained inside the holes 69. The holes 69 are formed to have a different shape from the circular shape of the particles 21. Further, the holes 69 are preferably have a shape in which convex parts 69a are formed around the circle, for example, so that a person can recognize that the ink has flowed. Accordingly, in the fifth exemplary embodiment, the shape of the holes 69 is formed to be a cross shape. Preferably, the volume of the hole 69 is not much larger than the volume of the particle 21 in order to prevent a situation in which the volume of the ink in the particle 21 is much smaller than the volume of the hole 69 opened in the base material 68. By providing the convex part 69a in the hole 69, a space is formed between the base material 68 and the particle 21. In short, a space is formed outside the outer periphery of the particle 21. Then, the ink flowed from the particle 21 extends to the convex part 69a.

By employing a structure like this, the ink is flowed along the shape of the hole 69 when the ink is flowed. Accordingly, patterns of the ink color having a shape different from that of the particle 21 are formed. Accordingly, it is possible to definitely recognize the flow of the ink.

Further, such a structure is employed in which the holes 69 are opened on the base material 68 and the particles 21 are put in the holes 69. The holes 69 are covered with the cover 67. In this way, even when a force is applied to the electromagnetic wave radiation detection member 66 in the vertical direction, the force is not directly applied to the particles 21 since the particles 21 are supported by the base material 68 held by the covers 67, thereby being able to prevent ink flow due to other factors than the electromagnetic wave radiation.

The ink in this case is preferably a colored one. However, it may be transparent. Even when transparent water is used, the transparent water is discolored when the ink flows by providing a test paper described in the first exemplary embodiment or a reagent of similar kinds between the base material 68 and the cover 67, for example. Accordingly, the detection can be made even when transparent liquid is used.

Further, in the fifth exemplary embodiment, the holes 69 are formed to have a cross shape. However, it is not limited to it. The holes 69 may have a shape like triangle, rectangle, or star shape. It is only required that the holes 69 have a shape to provide a tunnel-like space through which the ink flows between a cylindrical hole in which the particle 21 may be stored and outside the cylindrical space.

Further, it is not required that two covers 67 are provided in the structure. It is only required that the holes 69 opened in the base material 68 do not penetrate. In short, it is sufficient that the cover 67 is provided only on a side in which the holes 69 are provided in the base material 68. Then, the cover 67 is attached to the base material 68 so as to cover the holes 69 with this cover 67.

Further, the cover 67 may have such a structure to wrap the base material with a synthetic resin as a part of the waterproof container 21 described in the aforementioned example, e.g., a laminating resin. Further, instead of using the cover 67, two base materials 68 through which the holes 69 do not penetrate may be overlapped with each other. In this case, at least one of the base materials 68 is preferably a substantially transparent member, e.g., a silicone resin, so as to allow a person to check the situation of the ink from outside.

While the material of the base material 68 is resin or rubber, other materials may be used instead. For example, elements like a synthetic resin or a silicone rubber which hardly absorbs water is preferably used as the base material 68. This is because some urethane resins or elements like natural rubber have an effect for absorbing liquid like ink. Accordingly, the use of the elements having such an effect as the base material 68 may be an obstructive factor in detecting that the ink has flowed. Thus, it is preferable that the base material 68 is made of a material like a synthetic resin or a silicone rubber which hardly absorbs water. Further, it is preferable that the base material 68 has heat resistance.

Further, it is not required that the base material 68 is made of resin or rubber. It is only required that the base material 68 has such a structure in which it serves as a wall for preventing the ink from being leaked outside when the ink flows and it does not absorb the ink to allow a person to recognize that the ink has flowed. For example, the base material 68 may have a structure in which a silicone resin as a water repellent is applied to a solid like a cloth or a paper which is easy to be processed.

Sixth Exemplary Embodiment

In the first to fifth exemplary embodiments, ink is poured into an element like a microcapsule to form a particle. However, in a sixth exemplary embodiment, ink is poured into a bag-like element instead of a particle-like element.

In the structure in which the particle is damaged by thermal expansion or the structure in which the film is dissolved by heat, it is required that the manufacturing accuracy of the film of the particle is high and the film needs to be manufactured with great care. However, by taking into consideration the time for radiation to dry the wet equipment in the microwave oven, the ink flows from the bag due to radiation of microwaves even when the ink is put into a bag-like element. Thus, it is possible to detect the electromagnetic wave radiation.

Specifically, such a structure may be employed in which the abrupt volume expansion when the ink boils by heat and is vaporized breaks the bag in which the ink is sealed. As a matter of course, both phenomena of ink flow due to the volume expansion as a result of vaporization and dissolution of the film due to heat may be used together.

Figure 15:
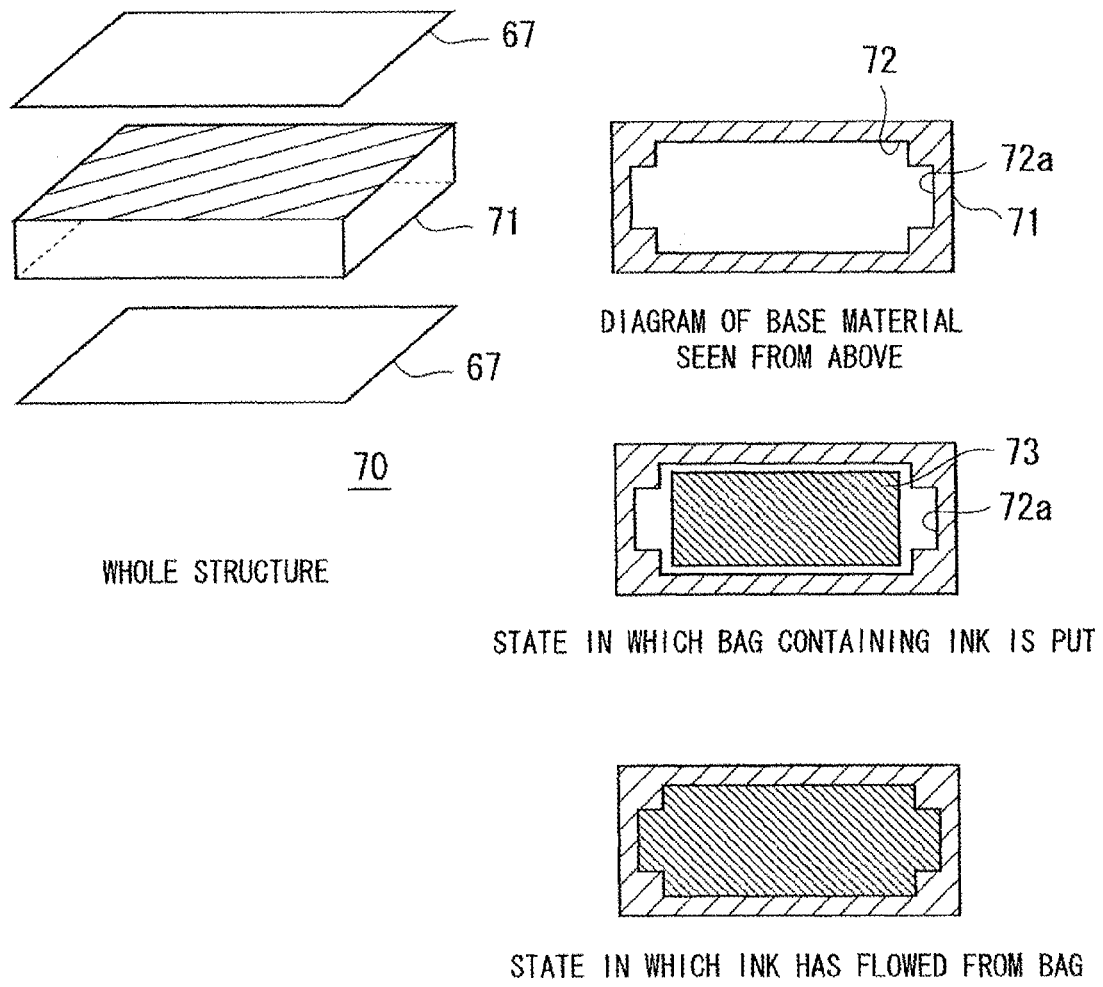
FIG. 15 is a diagram showing a structure of an electromagnetic wave radiation detection member according to a sixth exemplary embodiment in detail.

With reference to FIG. 15, an electromagnetic wave radiation detection member that detects and records radiation of electromagnetic waves according to the sixth exemplary embodiment of the present invention will be described. FIG. 15 is a diagram showing a structure of the electromagnetic wave radiation detection member according to the sixth exemplary embodiment in detail. Description of the same components as those in the above exemplary embodiments will be omitted as appropriate.

With reference to FIG. 15, the structure of the base material 68 and the structure of the particle 21 having ink in an electromagnetic wave radiation detection member 70 are different from those in the fifth exemplary embodiment. In the electromagnetic wave radiation detection member 70, a cover 67, a base material 71, and a cover 67 are joined together. In short, two covers 67 hold the base material 71 from both sides. In the base material 71, a cross-shaped hole 72 is opened into which a bag 73 containing ink is put. One hole 72 is formed for the whole part of the base material 71. The bag 73 is formed of a resin like nylon which is substantially transparent and is broken due to an increase in inner pressure by heat, as is the same to the aforementioned exemplary embodiments. The thickness of the base material 71 is preferably larger than the thickness of the bag 73. Then, the bag 73 including the ink is arranged inside the hole 72. The rectangular bag 73 is smaller than the hole 72 in plane diagram. Accordingly, a convex part 72a is provided in the hole 72 to form space between the base material 71 and the bag 73.

When the ink is irradiated with microwaves which are electromagnetic waves in the microwave oven, the ink boils inside the bag 73 in which the ink is put, and a part of the ink is evaporated. The volume is abruptly expanded since a part of the ink changes from liquid to gas. Accordingly, the inner pressure of the bag 73 increases, which expands and breaks the bag 73. When the bag 73 is broken, the ink flows along with the shape of the hole 72. It can be seen from outside that the ink has flowed since the shape of the bag 73 changes. In this example, the flow of the ink can be checked since the ink extends to the whole part of the hole 72. Further, the convex part 72a is formed in the hole 72 also in the exemplary embodiment 72. Space is formed in the outer peripheral surface of the bag 73 by the convex part 72a. Accordingly, the ink flowed from the bag 73 extends to the convex part 72a.

While shown above is an example in which the shape of the bag 73 is a rectangular parallelepiped, the bag 73 may have any desired shape as long as its shape is different from that of the hole 72. The bag 73 is preferably a spherical shape since it facilitates an operation to put the bag 73 into the hole. Further, as is similar to the exemplary embodiments above, the hole 72 may have any desired shape as long as its shape is different from that of the bag 73. Further, it is not necessary that the number of covers 67 is two as described in the exemplary embodiment above.

Further, in this structure, the ink becomes gas, and the inner pressure of the bag 73 breaks the bag 73 and the ink flows. In this structure, the pressure is applied also to the inner part of the electromagnetic wave radiation detection member 70. When it is not desired to flow the ink outside the electromagnetic wave radiation detection member, it is desirable to employ such a structure like a waterproof container which is not broken by the inner pressure as described in the aforementioned exemplary embodiment. For example, by sealing the space in which the ink flows by a silicone resin, such a structure with elasticity may be achieved which is not broken even with the increase in the inner pressure.

As described in the fifth exemplary embodiment, two base materials made of a silicone resin through which holes do not penetrate may be bonded. Alternatively, one of the base materials 71 formed of a silicone resin is used as the cover 67.

Further, as described in the fifth exemplary embodiment, the base material 71 may be made of a cloth and water repellent. In this case, even when the inner pressure increases by vaporization of the ink, the vaporized ink transmits the cloth. Thus, only the ink as liquid is repelled and left by the water repellent, which provides a structure which is hardly broken even with the increase in the inner pressure. Alternatively, instead of using the cloth, a paper which is an aggregation of fibers which has high permeability with respect to steam having relatively high pressure may be used. In this way, it is preferable that the base material 71 has air permeability and water repellency.

Seventh Exemplary Embodiment

A microwave oven that radiates microwaves is used as a source for radiating electromagnetic waves in the first to sixth exemplary embodiments. However, the present invention is not limited to this. Further, while the electromagnetic waves are microwaves here, the frequency band of the electromagnetic waves used in the microwave oven is defined by the radio law for each country, and varies depending on the countries. For example, the band of 800 MHz is used for microwave ovens in the U.S.A, and the band of 2.45 GHz is used for microwave ovens in Japan. Accordingly, the electromagnetic waves are not limited to a frequency of micro order. It is only required that liquid like water or metal like iron is heated by electromagnetic waves. Accordingly, the electromagnetic waves may be high-frequency waves or the like other than microwaves as long as liquid or metal can be heated by electromagnetic waves. Further, the present invention is also applicable to an apparatus heated using an electromagnetic induction phenomenon. Thus, in the specification, the electromagnetic waves include a high-frequency magnetic field or the like.

In recent years, heating equipment including an IH cooking heater using the electromagnetic induction phenomenon has become spread, and the heating equipment may be erroneously used as means for drying wet equipment, for example.

Figure 16:
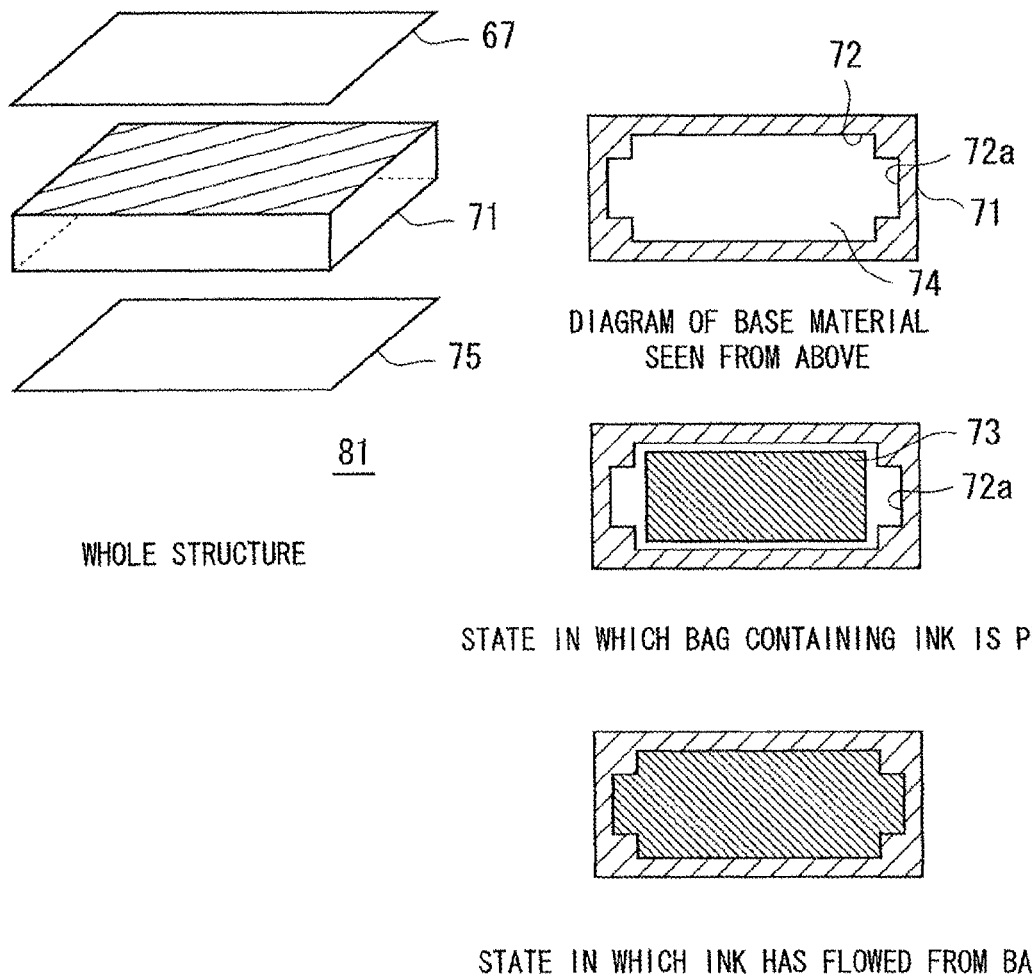
FIG. 16 is a diagram showing a structure of an electromagnetic wave radiation detection member according to a seventh exemplary embodiment in detail.

Referring to FIG. 16, an electromagnetic wave radiation detection member 81 according to a seventh exemplary embodiment will be described. The electromagnetic wave radiation detection member 81 detects and records radiation of electromagnetic waves. In the seventh exemplary embodiment, as is different from the sixth exemplary embodiment, one cover is made of metal. Description of the same components as those in the aforementioned exemplary embodiments are omitted as appropriate.

Referring to FIG. 16, a lower cover 75 is made of metal. A conductor of gold, silver, iron, copper, aluminium or the like may be used as the metal material of the cover 75. Further, the cover 75 is formed of iron as a magnetic body with relatively high electrical resistance which is easily heated and reacted by the IH cooking heater. Further, an upper cover 67 is formed of a substantially transparent member so as to allow a person to check the state of the ink. The cover 75 is heated by a high-frequency magnetic field released from the IH cooking heater. This dissolves a bag 73 contacted to the cover 75 and flows the ink inside the bag 73. In order to efficiently heat the cover by the high-frequency magnetic field, the cover 75 preferably has a relatively larger area than that in the exemplary embodiments described above. In FIG. 16, the cover 75 is shown to have the same size as the base material 71. However, the size of the cover 75 may be larger than that of the base material 71 in order to efficiently heat the cover.

Further, when this electromagnetic wave radiation detection member 81 is attached to the mobile terminal device, such a structure may be employed in which the cover 75 faces the side of the external peripheral part of the device and the cover 67 faces the side of the inner part of the device in a position extremely close to the outer peripheral part of the device in order to efficiently receive the high-frequency magnetic field released from the IH cooking heater.

Figure 17:
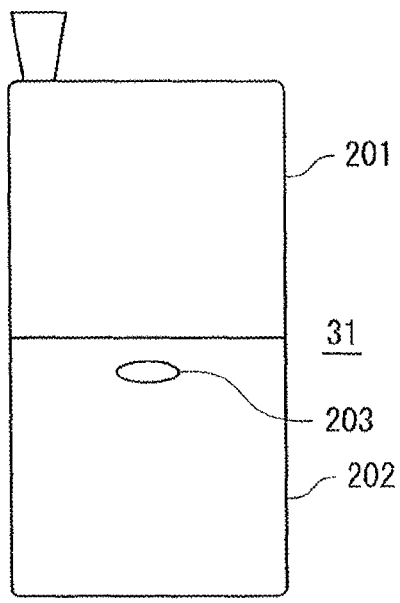
FIG. 17 is a diagram showing a structure in which the electromagnetic wave radiation detection member according to the seventh exemplary embodiment is attached to a mobile terminal device.
Figure 17:
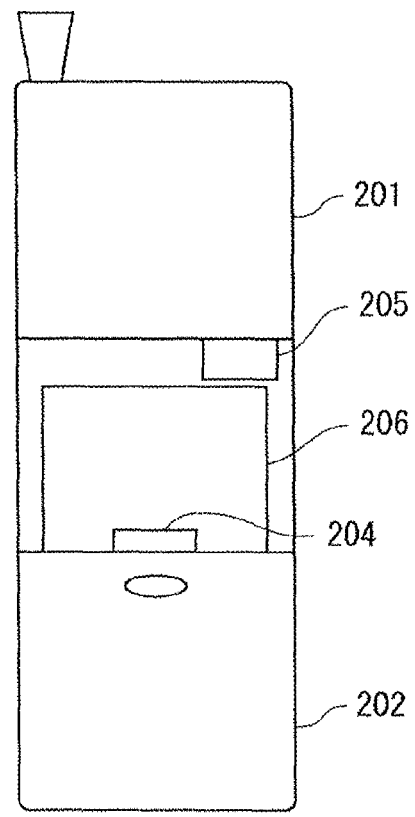
Figure 17:
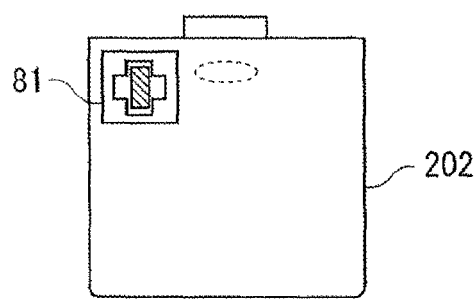

Next, with reference to FIG. 17, a state in which the electromagnetic wave radiation detection member 81 is attached to a mobile terminal device will be described. FIG. 17 is a diagram schematically showing a rear side of the mobile terminal device to which the electromagnetic wave radiation detection member 81 is attached.

As shown in FIG. 17, a mobile terminal device 31 includes a case 201, a battery cover 202, and an support groove 203. The battery cover 202 is removably attached to the case 201. When the battery cover 202 is removed from the case 201, an IC card 205 and a battery 206 are exposed. The IC card 205 and the battery 206 are arranged inside the mobile terminal device 31. The battery cover 202 is slidably engaged with the case 201. A claw 204 is provided in the battery cover 202. Since the claw 204 fits the case 201, the battery cover 202 is fixed to the case 201 and covers the IC card 205 and the battery 206. The support groove 203 warps the battery cover 202 in a direction in which the fitting of the claw 204 is released.

Further, the electromagnetic wave radiation detection member 81 is provided on the rear side of the battery cover 202. The electromagnetic wave radiation member 81 is attached in such a way that the cover 75 is arranged on the surface contacted to the battery cover 202 and the cover 67 is arranged on the front side of the drawing. Accordingly, it is possible to check whether the electromagnetic wave radiation detection member detects electromagnetic waves by removing the battery cover 202.

Further, when the battery cover 202 is fit into the case 201 by the claw 204, the electromagnetic wave radiation detection member 81 is arranged immediately above the IC card 205. Accordingly, the metal cover 75 is arranged to cover the IC card 205. This makes it possible to prevent data directly recorded in the IC card from being destructed by the high-frequency magnetic field, and from being physically destroyed. Accordingly, it is possible to prevent damage of the IC card 205. Further, the cover 75 is formed of iron which is easily heated compared to metal (gold, copper, aluminium) used as electrical wiring in an IC card or an electronic circuit. Accordingly, even when the device is destructed by a high-frequency magnetic field, it is possible to specify the cause of the destruction.

The seventh exemplary embodiment has been described by taking the IH cooking heater as an example. Since the electromagnetic waves (including high-frequency waves) with which water or metal is heated by radiation lead to a failure of equipment, the frequency or radiation energy is not limited. Further, the equipment is not limited to electronic equipment. For example, the electromagnetic wave radiation detection member 81 may be attached to a doll made of vinyl. The electromagnetic wave radiation detection member 81 may be attached to an object (object to be detected) or equipment which causes malfunction due to heat by inadvertent electromagnetic waves, to detect that strong electromagnetic waves with heat have been applied. Note that a plurality of electromagnetic wave radiation detection members 81 may be attached to one mobile terminal device.

Eighth Exemplary Embodiment

Described in the first to seventh exemplary embodiments is the structure in which liquid is put into a bag. However, the present invention is not limited to such a structure. In the eighth exemplary embodiment, an example in which a liquid-like substance is used will be described.

Gel including liquid or a powder-like material may be used instead of liquid. For example, when water is used, a polymer water absorbing material as gel, or cellulose type, in particular carboxymethylcellulose having a water-retaining function may be used. Alternatively, dry water may be used in which water is covered with modified silica, which looks like a power-like material so that adjacent water droplets do not stick to each other even when water droplets are adjacent to each other.

They have the similar features as liquid water when receiving microwaves from a microwave oven or heat from outside, which causes an increase in temperature, thermal expansion, or vaporization. Accordingly, the similar effect as in the first to seventh exemplary embodiments may be achieved.

In this way, a detection material is not limited to liquid such as ink, but may be a material including liquid. In short, the liquid itself may be the detection material, and a solid or gel including liquid may be used as the detection material. The liquid may be contained in the bag while being included in a power-like substance or a gel-like substance. The power-like or gel-like detection material may be contained in the film to form a bag. Further, the first to eighth exemplary embodiments may be appropriately used in combination.

While the present invention has been described with reference to the exemplary embodiments stated above, the present invention is not limited by the description above. Various changes that can be understood by a person skilled in the art may be made to the structure and the details of the present invention. The present invention may be applied to a mobile terminal device, and thus can be used for information and communication industries.

A part or all of the aforementioned exemplary embodiments may be described also as in the following Supplementary Notes. However, it is not limited to the following description.

(Supplementary Note 1)

An electromagnetic wave radiation detection member comprising:
 a detection material containing liquid and discoloring a substance to be attached to which the detection material adheres; and
 a bag including the detection material therein and from which the liquid flows out due to radiation of electromagnetic waves.

(Supplementary Note 2)

The electromagnetic wave radiation detection member according to Supplementary Note 1, further comprising the substance to be attached to which the liquid flowing out from the bag is adhered.

(Supplementary Note 3)

The electromagnetic wave radiation detection member according to Supplementary Note 2, wherein the substance to be attached comprises a test paper discolored when the liquid adheres to the test paper.

(Supplementary Note 4)

The electromagnetic wave radiation member according to Supplementary Note 3, wherein
 the liquid is transparent, and
 the test paper is discolored by a chemical reaction when the liquid adheres to the test paper.

(Supplementary Note 5)

The electromagnetic wave radiation detection member according to Supplementary Note 2, wherein the substance to be attached comprises a base material having a hole containing the bag, and the liquid flows out to the hole of the base material from the bag due to radiation of electromagnetic waves.

(Supplementary Note 6)

The electromagnetic wave radiation detection member according to Supplementary Note 4, wherein a convex part forming space between the bag and the base material is formed in the hole, and the liquid flowed from the bag extends to the convex part.

(Supplementary Note 7)

The electromagnetic wave radiation detection member according to Supplementary Note 4 or 5, wherein a transparent cover covering the hole is attached to the base material.

(Supplementary Note 8)

The electromagnetic wave radiation detection device according to any one of Supplementary Notes 2 to 7, wherein the substance to be attached has air permeability and water repellency.

(Supplementary Note 9)

The electromagnetic wave radiation detection member according to any one of Supplementary Notes 1 to 8, wherein the liquid is ink having a different color from that of the substance to be attached.

(Supplementary Note 10)

The electromagnetic wave radiation detection member according to any one of Supplementary Notes 1 to 9, further comprising a waterproof container sealing the bag and the substance to be attached.

(Supplementary Note 11)

The electromagnetic wave radiation detection member according to Supplementary Note 10, wherein the waterproof container is formed of a transparent resin.

(Supplementary Note 12)

The electromagnetic wave radiation detection member according to Supplementary Note 10 or 11, wherein at least a part of an outer wall of the waterproof container has adhesiveness.

(Supplementary Note 13)

The electromagnetic wave radiation detection member according to any one of Supplementary Notes 1 to 12, wherein liquid included in the detection material is vaporized and expanded when the liquid is irradiated with electromagnetic waves, and the bag bursts by a volume of the liquid whose temperature has reached a predetermined temperature.

(Supplementary Note 14)

The electromagnetic wave radiation detection member according to any one of Supplementary Notes 1 to 13, wherein temperature of the bag increases when the bag is irradiated with electromagnetic waves, and the bag dissolves when the temperature reaches a predetermined temperature.

(Supplementary Note 15)

The electromagnetic wave radiation detection member according to any one of Supplementary Notes 1 to 14, wherein the bag is formed of a thermoplastic resin.

(Supplementary Note 16)

The electromagnetic wave radiation detection member according to any one of Supplementary Notes 1 to 15, wherein the liquid is included in the bag while being included in a power-like or gel-like substance.

(Supplementary Note 17)

A device to which the electromagnetic wave radiation detection member according to any one of Supplementary Notes 1 to 16 is attached.

(Supplementary Note 18)

The device according to Supplementary Note 17, wherein the device is a mobile terminal device, and the electromagnetic wave radiation equipment is attached to an insertion unit of an external memory.

(Supplementary Note 19)

The device according to Supplementary Note 17 or 18, wherein the device is a mobile terminal device, and the electromagnetic wave radiation equipment is attached to an earphone connection unit.

(Supplementary Note 20)

The device according to any one of Supplementary Notes 17 to 19, wherein the device is a mobile terminal device, and the electromagnetic wave radiation equipment is attached to a vicinity of an antenna part.

(Supplementary Note 21)

The device according to any one of Supplementary Notes 17 to 20, wherein the device is a mobile terminal device, a metal cover is provided to the electromagnetic wave radiation detection member, and the electromagnetic wave radiation detection member is attached to the mobile terminal device in a way that the cover covers an IC card.

(Supplementary Note 22)

An electromagnetic wave radiation detection method comprising:

flowing out a detection material comprising liquid from a bag due to electromagnetic wave radiation; and attaching the detection material flowed from the bag to a substance to be attached to discolor the substance to be attached.

(Supplementary Note 23)

The electromagnetic wave radiation detection method according to Supplementary Note 22, wherein the substance to be attached comprises a test paper discolored when the liquid adheres to the test paper.

(Supplementary Note 24)

The electromagnetic wave radiation method according to Supplementary Note 23, wherein the liquid is transparent, and the test paper is discolored by a chemical reaction when the liquid adheres to the test paper.

(Supplementary Note 25)

The electromagnetic wave radiation detection method according to Supplementary Note 22, wherein the substance to be attached comprises a base material having a hole containing the bag, and the liquid flows out to the hole of the base material from the bag due to radiation of electromagnetic waves.

(Supplementary Note 26)

The electromagnetic wave radiation detection method according to Supplementary Note 25, wherein a convex part forming space between the bag and the base material is formed in the hole, and the liquid flowed from the bag extends to the convex part.

(Supplementary Note 27)

The electromagnetic wave radiation detection method according to Supplementary Note 25 or 26, wherein a transparent cover covering the hole is attached to the base material.

(Supplementary Note 28)

The electromagnetic wave radiation detection method according to any one of Supplementary Notes 22 to 27, wherein the substance to be attached has air permeability and water repellency.

(Supplementary Note 29)

The electromagnetic wave radiation detection method according to any one of Supplementary Notes 22 to 28, wherein the liquid is ink having a different color from that of the substance to be attached.

(Supplementary Note 30)

The electromagnetic wave radiation detection method according to any one of Supplementary Notes 22 to 28, wherein the bag and the substance to be attached are sealed by a waterproof container.

(Supplementary Note 31)

The electromagnetic wave radiation detection method according to Supplementary Note 30, wherein the waterproof container is formed of a transparent resin.

(Supplementary Note 32)

The electromagnetic wave radiation detection method according to Supplementary Note 30 or 31, wherein at least a part of an outer wall of the waterproof container has adhesiveness.

(Supplementary Note 33)

The electromagnetic wave radiation detection method according to any one of Supplementary Notes 22 to 32, wherein
- liquid included in the detection material is vaporized and expanded when the liquid is irradiated with electromagnetic waves, and
- the bag bursts by a volume of the liquid whose temperature has reached a predetermined temperature.

(Supplementary Note 34)

The electromagnetic wave radiation detection method according to any one of Supplementary Notes 22 to 33, wherein temperature of the bag increases when the bag is irradiated with electromagnetic waves, and the bag dissolves when the temperature reaches a predetermined temperature.

(Supplementary Note 35)

The electromagnetic wave radiation detection method according to any one of Supplementary Notes 22 to 34, wherein the bag is formed of a thermoplastic resin.

(Supplementary Note 36)

The electromagnetic wave radiation detection method according to any one of Supplementary Notes 22 to 35, wherein the liquid is included in the bag while being included in a powder-like or gel-like substance.

This application claims the benefit of priority, and incorporates herein by reference in its entirety, the following Japanese Patent Application No. 2009-268980 filed on Nov. 26, 2009.

INDUSTRIAL APPLICABILITY

The present invention can be applied to a mobile terminal device, and thus can be used for information and communication industries.

REFERENCE SIGNS LIST

1 Detection Material
2 Bag
11 Microwave Radiation History Leaving Sheet
12 Waterproof Container
21 Particle
22 Test Paper
23 Plate-Like Material
31 Mobile Terminal Device
32 Vicinity of Earphone Connection Unit
33 Vicinity of Antenna Part
41 Ink
42 Film
51 Part Where Test Paper 22 is Discolored
61 Electromagnetic Wave Radiation Detection Member
63 Base
64 Adhesive Material
65 Protective Sheet
66 Electromagnetic Wave Radiation Detection Member
67 Cover
68 Base Material
69 Hole
69A Convex Part
70 Electromagnetic Wave Radiation Detection member
71 Base Material
72 Hole
72A Convex Part
73 Bag
75 Cover
101 Mobile Terminal Device
201 Case
202 Battery Cover 202
203 Support Groove
204 Claw
205 IC Card
206 Battery

The invention claimed is:

1. An electromagnetic wave radiation detection member comprising:
  a detection material containing liquid and a substance that discolors that is attached to the detection material; and
  a bag including the detection material therein and from which the liquid flows out due to radiation of electromagnetic waves.

2. The electromagnetic wave radiation detection member according to claim 1, further comprising the liquid flowing out of the bag is adhered to the substance.

3. The electromagnetic wave radiation detection member according to claim 2, wherein the substance comprises a test paper that is discolored when the liquid adheres to the test paper.

4. The electromagnetic wave radiation detection member according to claim 2, wherein the substance comprises a base material contained in the bag with a hole, and the liquid flows out of the hole due to radiation of electromagnetic waves.

5. The electromagnetic wave radiation detection member according to claim 4, wherein a transparent cover covering the hole is attached to the base material.

6. The electromagnetic wave radiation detection member according to claim 2, wherein the substance has air permeability and water repellency.

7. The electromagnetic wave radiation detection member according to claim 1, further comprising a waterproof container sealing the bag and the substance.

8. The electromagnetic wave radiation detection member according to claim 1, wherein the liquid is included in the bag with a powder-like or gel-like substance.

9. A device to which the electromagnetic wave radiation detection member according to claim 1 is attached.

10. An electromagnetic wave radiation detection method comprising:
  allowing a detection material comprising liquid to flow out from a bag due to electromagnetic wave radiation; and
  attaching a substance that discolors to the detection material that flows out from the bag.

11. The electromagnetic wave radiation detection member according to claim 3, wherein the substance has air permeability and water repellency.

12. The electromagnetic wave radiation detection member according to claim 4, wherein the substance has air permeability and water repellency.

13. The electromagnetic wave radiation detection member according to claim 5, wherein the substance has air permeability and water repellency.

14. The electromagnetic wave radiation detection member according to claim 2, further comprising a waterproof container sealing the bag and the substance.

15. The electromagnetic wave radiation detection member according to claim 3, further comprising a waterproof container sealing the bag and the substance.

16. The electromagnetic wave radiation detection member according to claim 4, further comprising a waterproof container sealing the bag and the substance.

17. The electromagnetic wave radiation detection member according to claim 5, further comprising a waterproof container sealing the bag and the substance.

18. The electromagnetic wave radiation detection member according to claim 6, further comprising a waterproof container sealing the bag and the substance.

19. The electromagnetic wave radiation detection member according to claim 2, wherein the liquid is included in the bag with a powder-like or gel-like substance.

20. The electromagnetic wave radiation detection member according to claim 3, wherein the liquid is included in the bag with a powder-like or gel-like substance.

\* \* \* \* \*